INVENTORS
OLAV ERGA &
SVEN GREGERT TERJESEN
BY
*Eyre, Mann & Lucas*
ATTORNEYS

Nov. 20, 1962

O. ERGA ET AL 3,064,408

PROCESS AND APPARATUS FOR REMOVING HF
FROM GASES FROM ALUMINUM FURNACES

Filed Dec. 29, 1959

INVENTORS
OLAV ERGA &
SVEN GREGERT TERJESEN
BY

*Eyre, Mann & Lucas*

ATTORNEYS 3,064,408
Patented Nov. 20, 1962

1

3,064,408
PROCESS AND APPARATUS FOR REMOVING HF
FROM GASES FROM ALUMINUM FURNACES
Olav Erga, Mosjoen, and Sven Gregert Terjesen, Trond-
heim, Norway, assignors to Elektrokemisk A/S, Oslo,
Norway, a corporation of Norway
Filed Dec. 29, 1959, Ser. No. 862,590
Claims priority, application Norway Dec. 30, 1958
10 Claims. (Cl. 55—71)

The waste gases from electrolytic furnaces used for the reduction of alumina to produce aluminum contain in addition to $CO_2$ and CO some HF and oxides of sulfur and may contain traces of tar fumes. The fluorine in the gases is strongly corroding and is apt to be extremely injurious to surrounding vegetation. As a result in many places the authorities demand that the gases be cleaned before they are let out in the atmosphere. It is also true that the fluorine content of these gases is very valuable. Accordingly it has been recognized for many years that it is of great economic importance to be able to wash these gases to remove this fluorine in such form that it can be processed to produce cryolite that can be reused in electrolytic furnaces.

In the ordinary process heretofore used, the gases are washed with a dilute soda solution to form NaF which can be removed from the solution by precipitation. In such case the sulfur compounds will also be absorbed with the soda solution and this may cause contamination of the precipitated fluorine compounds so that they cannot later be used in the electrolytic furnace.

It has been suggested that a selective absorption of HF can be had by maintaining the solution at a pH just below 7 in which case the sulfur oxides will not be removed. However, it is very difficult to maintain proper controls and this makes for difficulties.

In any event where soda solutions are used it has been found necessary to recirculate the solution to maintain a fluorine concentration which permits an economical processing. In order to handle the fluorine economically the solution must be brought up to the point where it contains at least 5 g. of F per liter and preferably a much higher concentration is desired. For example, ordinarily it is considered necessary to maintain an NaF content of somewhere around 30 to 35 g. per liter which corresponds to between 13 and 16 g. F per liter.

According to the present invention we have discovered a new way of scrubbing the gases which permits us to scrub them with clean water and to carry on the operation so efficiently that concentrations of more than 50 g. of F per liter have been obtained. This corresponds to between 97% and 99% absorption of the HF content of the gases and at the same time the absorption of $SO_2$ is less than 1%.

In order to obtain the high concentration of fluorine which we desire it is necessary to contact large quantities of gas with relatively small quantities of water and yet carry on this contact in such a way that the fluorine will largely be removed from the gas. As regards the relative quantities of water and gas, calculations show that to obtain a concentration of 5 g. of F per liter it is necessary to use about 10,000 volumes of gas calculated at a temperature of 50° C. and 1 atmosphere of pressure for each volume of water. For the higher concentrations of fluorine the amounts of gas may run up to as much as 100,000 volumes for each volume of water. Heretofore no method has been known of efficiently scrubbing such large volumes of gas with such small relative amounts of liquid without recirculation.

We have succeeded in performing this operation with great success by the methods of the present invention. According to this invention we carry on the operation in a tower in which the gas (preferably after a preliminary washing) is first mingled with a spray of water which moves co-flow with the gas. After that the gas is passed in the form of bubbles through a layer of the liquid, then the gas leaving this layer of liquid is contacted with baffles to knock out the water droplets and the cycle is completed by having the gas passed through a restricted orifice so that its velocity is increased. While passing through such orifice it is again sprayed with additional quantities of fresh water which moves upwardly with the gas and then the gas and droplets of water pass through another perforated plate so that the gas is caused to bubble through another layer of liquid.

By spraying the water so that it moves co-flow with the gas, contact is had between the gas and the great surface of the droplets of water and then these droplets are directed against the bottom surface of the plate on which the next successive layer of water rests. This spray will maintain a film of water on the bottom of such plate and this film will be continuously forced, by movement of the gas, towards the holes in the plate and as the liquid film moves across the plate it carries with it any drops of liquid that might tend to leak through the holes in the plate or any deposited impurities such as tars or the like. In this way the gas is subjected to a series of scrubbings with water which carries fluorine compounds into the mass of water. At the same time we arrange for the overflow from one plate to pass down to the next lower plate so that the mass of water moves downwardly countercurrent to the gas flow and the bubbling effect on the perforated plates gives the progressive advantages of usual countercurrent scrubbing. It is not necessary and ordinarily is not advisable to add any scrubbing agent to the water but small amounts of additives do not change the effect and the addition of surface active substance may be helpful.

The design of plates for perforated plate contact units is known in the art and as is customary a very large number of perforations are employed which may for example be arranged in staggered rows.

In carrying out our invention, we employ a column having a number of perforated plates arranged in it. The actual number is not critical but we usually find from 3 to 6 such plates to be satisfactory. Overflow pipes are arranged so that a liquid level of desired depth is maintained on each plate and as the level of liquid rises an overflow pipe carries the liquid down to the next plate where it is used for scrubbing the gas by bubble action. The level of the liquid on each plate may form a layer which may be, for example, between 25 mm. and 150 mm. thick. A thickness of about 100 mm. usually is satisfactory. As the water is moving countercurrent to the gas, the gas which contacts the water on the plates is progressively richer in fluorine compounds as the water approaches the point of maximum solution of F.

Above each plate a set of baffles is arranged to remove droplets from the gas stream. Such baffles preferably are arranged with a peripheral baffle having a central opening overlying a central baffle that prevents direct flow of the gas above each plate upward without impact. This arrangement collects the gas into a restricted central area and thereby increases its velocity before it reaches the next plate.

Above the central aperture of the upper baffle member an upwardly directed spray is arranged so that it is centrally positioned relative to the gases which pass upwardly through the aperture in the upper baffle member.

Preferably this spray is surrounded by a ring or sleeve member above which is positioned an inverted cone or funnel which permits the gases and the spray to spread out to cover the surface of the next higher perforated plate. After passing through several of the sprays, then through the associated perforated plates carrying layers of water and through the baffles with restricted central openings, the waste gases from which most of the HF has been removed leave at the top of the tower.

We have found it ordinarily desirable to give the gases a preliminary scrubbing and for this purpose we prefer to admit the gases horizontally and eccentrically below the bottom plate and as they enter the space below the bottom plate we spray them to remove dust and fumes. This helps to prevent clogging of the holes in the perforated plates. For this purpose we prefer to use off-liquid which has passed through the column, as this prevents further dilution.

The apparatus in which the invention is carried out, and which itself involves features of novelty, is illustrated in the accompanying drawing in which FIG. 1 is a sectional view through the bottom portion of a column which shows two of the perforated plates. This section is taken on line 1—1 of FIG. 3.

Figure 1:
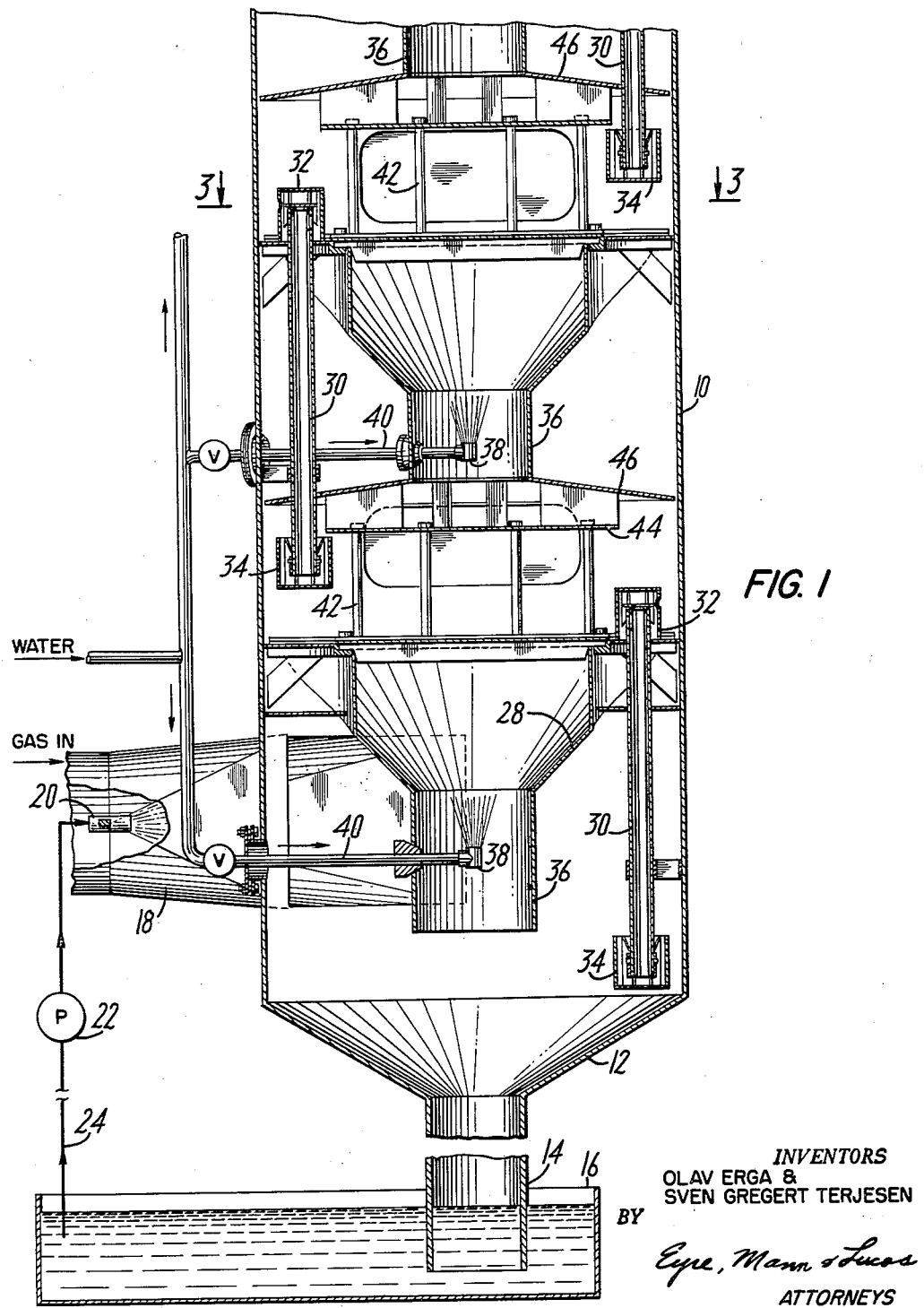

In these drawings 10 is the outer shell of the tower and it is understood that this whole structure is made of acid resistant material such as polyvinyl chloride or if metal is used, the metal must be carefully protected from exposure to the corrosive effects of HF. To indicate the size of the tower it may, for example, be 1.4 meters inside diameter and the plates may be spaced 1.3 meters apart. It is understood that these dimensions are merely indicative of a working size of the device and are not intended in any way to impose a limitation on the invention.

The bottom of the tower is tapered inwardly as shown at 12 and provided with a down pipe 14 for the off-liquid which may be conducted into any convenient receptacle as indicated at 16. The gas is admitted into the lower part of the tower through a centrifugally arranged gas inlet 18. This gas is previously put under pressure (as by a pump not shown) sufficient to force it through the tower at the desired velocity. The inlet 18 is preferably provided with a nozzle 20 for spraying a washing liquid for giving the incoming gas a preliminary scrubbing. This washing liquid can advantageously be off-liquid withdrawn from the receptacle 16 by pump 22 and pipe 24.

As shown in FIG. 1 a perforated plate 26 is positioned a short distance above gas inlet 18. The perforated plates used in the apparatus may, for example, be approximately 13 mm. thick and the perforations in the plate may have a diameter of about 6 mm. The holes preferably are arranged in staggered rows so that their centers form triangles and the centers may for example be 19 mm. apart. Again it is undestood that these dimensions are given only by way of illustration.

Figure 3:
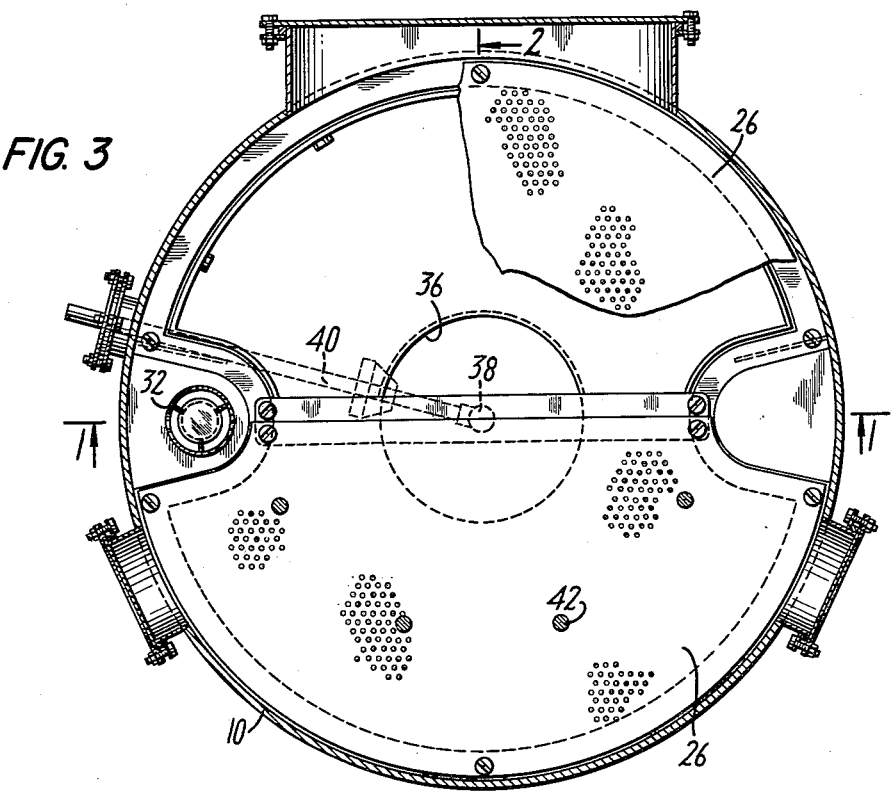
FIG. 3 is a section on line 3—3 of FIG. 1.

To avoid undue crowding of the drawing only a part of the plate 26 is shown in FIG. 3 as perforated, but it is to be understood that the holes are spaced throughout the available area.

Figure 2:
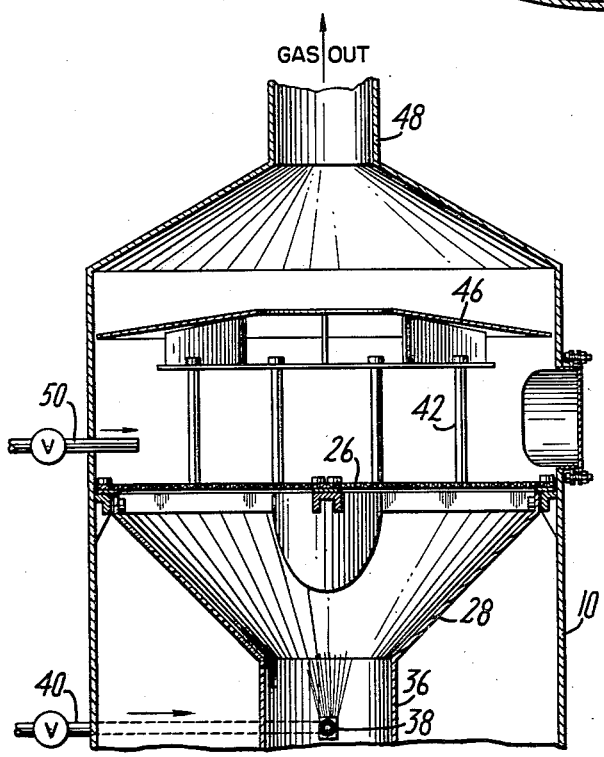
FIG. 2 is a section at the top of the column showing one perforated plate and this section is taken on line 2—2 of FIG. 3.

Below the perforated plate 26 is an inverted cone 28 forming a gas distribution area for distributing the gases to the plate 26. As indicated in FIG. 3 the cone has its walls formed to provide spaces on each side of the plate 26 in which a down pipe can be positioned. As the gas cannot contact these spaces they are not perforated. Such a down pipe is shown at 30 and each such down pipe 30 is provided with a covering cylindrical cap 32 having an admission hole spaced appreciably above the plate 26 so that the liquid cannot drain off the plate 26 in the event that feeding of the liquid is slowed down. This layer of liquid should be of substantial thickness ranging, as previously stated for example, between 25 mm. and 150 mm. thick. In the same way the bottom of each down pipe has a water seal cup 34. The down pipes are arranged on alternate sides of the tower so that there cannot be a direct flow from one down pipe to the other without passing over the intervening plate. It will be noted that FIG. 1 shows a section through the down pipe and therefore in these sections the cone 28 does not appear to come out all the way to the edge of the plate 26 above it. However, the corresponding cone 28 in FIG. 2 does show the way that the cone comes out to the periphery of the plate 26 for most of the circumference. Below the cone 28 is a sleeve member 36 through which the gas must pass upward. In the illustrative drawings the sleeve member 36 has a diameter which is only about 2/7 of the inside diameter of the casing 10. This means that the gases going up through this sleeve member will have a greatly increased velocity. In the center of each sleeve member 36 is arranged a spray nozzle 38 at the end of a pipe 40. The spray nozzle 38 sprays water upward into the cone 28. This spray should be adjusted to form fine droplets, but preferably they should be more than just a mist as it is desired that they shall be carried upward by the gas stream so that they will make an appreciable impact on the plate 26 immediately above. The velocity of the gas stream should be great enough to carry substantially all of the spray water through the perforations in the plate next-above and to hold liquid covering such plate from dripping back through such perforations.

Positioned above the plate 26 and carried on struts 42 is a disc or baffle 44 which, as shown, leaves a peripheral space between its outer edge and the inside wall of the tower 10. This space is covered by a disc 46 having a central opening which leads into a next higher sleeve member 36. The disc 46 and the baffle 44 together constitute a drop catcher so that drops carried up from the liquid on plate 26 will fall back into the mass of liquid on such plate.

It is understood that such number of sections, each containing a restrictive orifice, a spray and a perforated plate, may be employed as circumstances demand, but as previously stated this number ordinarily will range from 3 to 6. We have found very good results when four such plates are used.

At the top of the column above the topmost plate 26 the usual baffle 44 and disc 46 are supplied, but in this case the central opening of the disc 46 leads to an exit pipe 48 for the gases from which the fluorine compounds have been removed.

If desired, a pipe 50 may be provided for admitting liquid on to the topmost plate 26, principally for starting up the operation as we have found that when the apparatus is in use it is possible to supply all the water needed through the spray nozzles 38 and this is highly desirable. In any event, at least 10 percent of the water should be supplied through the nozzles and of course the aggregate amount of water that is supplied must be proportioned to the volume of gas passed through the device to get a proper concentration of F as has previously been explained.

The detailed operation of the process is illustrated by the following example in which an apparatus was used of the type that has just been described. In this case the tower was provided with only three plates.

The gas from an aluminum plant was fed into the tower at a pressure sufficient to maintain a velocity of 1.7 Nm.$^3$/min. The actual temperature of the ingoing gas varied between 60° and 91° C. whereas the temperature of the outgoing gas was between 24° and 31° C. The aggregate amount of wash water supplied (all of which was supplied through the spray nozzles) was only 70 ml./min.

The composition of the ingoing gas and the off-gas and the percentages of absorption are indicated in the following table which shows the materials entering into the gas in terms of mg./Nm.³ of gas.

| Component | Gas | | F in Form of Dust | | Other Dust | Tar |
|---|---|---|---|---|---|---|
| | F | S | Soluble in H₂O | Insoluble in H₂O | | |
| Gas supply | 256 | 289 | 69.7 | 20.2 | 429 | 387 |
| Offgas | 3.89 | 284 | 18.5 | 7.3 | 95 | 214 |
| Absorption, percent (including preliminary washing) | 98.5 | 1.7 | 73.5 | 63.8 | 77.8 | 44.6 |

The fluorine content of the off-liquid ranged between 19 and 38 grams per liter while the sulfur content was very low, ranging between .0026 and .0045 mols per liter. It was found that a velocity of the gas upward through the sleeves below the cones of from 9 to 10 m. per sec. was sufficient to rinse the bottom of the plates, to carry the spray water through the perforations and to prevent droplets from passing down through the perforations in the plates. The plates were examined at the end of about 4 days and it was found that all the plates were practically free from dust and tar deposits. It was further found that the fact that the gas carried with it the liquid from the sprays did not cause any noticeable increase in pressure drop with the moderate velocities of the liquid employed.

By this process we are able to eliminate in excess of 95% of the gaseous fluorine from the gas and are able to get a concentration of fluorine in the off-liquor in excess of 5 grams per liter and this concentration ordinarily can be caused to range above 15 grams per liter. All this is accomplished without recirculating the scrubbing water and without adding to it material such as soda in quantities such that the sulfur compounds will be removed with the fluorine. In other words we are able to clear up the gases cheaply and efficiently so that they can be released into the atmosphere and at the same time the fluorine will be in a form which permits ready conversion back to cryolite for reuse.

It is understood that the example given is only by way of illustration and is not to be taken as a limitation upon our invention.

What we claim is:

1. The process of selectively removing fluorine from waste gases from an aluminum furnace which comprises the steps of spraying the gas with water that moves co-flow with the gas so that the water is exposed to the gas in the form of droplets, scrubbing such gas carrying such droplets by bubbling the gas through a layer of water, again spraying such gas with additional water that moves co-flow with the gas, again bubbling such gas carrying droplets of the water through a second layer of water and simultaneously withdrawing water from such second layer, adding such water to said first layer and withdrawing water from said first layer containing at least 5 grams of F per liter.

2. A process as specified in claim 1, in which the gas after passing through each layer of water is caused to impact against baffles that remove droplets from such water before additional water is sprayed into such gas.

3. A process as specified in claim 1 in which the gas is caused to pass through a restricted orifice while it is being sprayed with water whereby its velocity is increased and then is caused to pass into an expanded area before being bubbled through the next layer of water.

4. A process as specified in claim 1 in which the gas is caused to bubble through the layer of water with such velocity that substantially no water moves counter current through the gas that is bubbling through the water.

5. An apparatus adapted to remove fluorine from waste gases from an aluminum furnace comprising a tower, means for causing the gas to move upwardly through the tower, means for spraying the gas with water so that the water will move upwardly co-flow with the gas, a perforated plate positioned above the spray, said plate supporting a first layer of liquid on the top surface thereof and a second layer of liquid on the bottom surface thereof, said second layer being maintained on the bottom surface of the plate by the upwardly moving spray and being continuously forced by the upwardly moving gas to flow across the plate and through the perforations into the first layer of liquid on the top surface of the plate, said second layer of liquid absorbing fluorine from the gas with its movement, a second spray above such plate for again spraying the gas with additional water so that such water will move upwardly co-flow with the gas, a second perforated plate positioned above the spray, said second plate supporting a first layer of liquid on the top surface thereof and a second layer of the liquid on the bottom surface thereof, said second layer being maintained on the bottom surface of the second plate by the upwardly moving spray and being continuously forced by the upwardly moving of gas to flow across the second plate and through the perforations into the first layer of liquid on the top surface of the second plate, said second layer of liquid absorbing fluorine with its movement, means for conducting water downwardly from an upper plate to a lower plate while maintaining a layer of water on such upper plate, and means for withdrawing from said lower plate water containing absorbed fluorine.

6. An apparatus for washing gases comprising a tower, a series of perforated plates in such tower, a gas distribution area below each such plate, a restricted orifice below each such gas distribution area through which gas will pass, a spray nozzle associated with each such orifice arranged to spray a washing liquid upward with the gas flow, baffles above each plate to knock droplets of the washing liquid out of the gas stream before it enters the next-above restricted orifice, means for supplying a washing liquid to said nozzles, means for supplying gas to the bottom of the column under sufficient pressure to carry the washing liquid from each nozzle through the next-above perforated plate, down pipes from each plate above the bottom plate to drain excess liquid from each such plate to the plate next-below while leaving a layer of liquid on each such plate, means for permitting gas to pass out from the top of the column and means for withdrawing liquid from the bottom of the column.

7. An apparatus as specified in claim 6 in which the baffles above each plate are arranged to form the restricted orifice below the next-above plate.

8. An apparatus as specified in claim 6 in which the said restricted orifice comprises a sleeve surrounding the associated nozzle and the gas distribution area is formed by an inverted cone running upward and outward from said sleeve to the periphery of the next-above perforated plate.

9. An apparatus as specified in claim 6 which further includes means for giving the gases a preliminary wash to remove dust and tars.

10. An apparatus as specified in claim 9 in which such washing means comprises means for spraying the incoming gases with off-liquid from the tower.

References Cited in the file of this patent

UNITED STATES PATENTS

| 1,172,930 | Brassert et al. | Feb. 22, 1916 |
| 2,009,347 | Sheldon | July 23, 1935 |
| 2,182,533 | Bowman | Dec. 5, 1939 |
| 2,354,674 | Fisher | Aug. 1, 1944 |
| 2,497,136 | Patterson | Feb. 14, 1950 |
| 2,591,343 | Eld | Apr. 1, 1952 |
| 2,868,524 | Annable et al. | Jan. 13, 1959 |
| 2,895,566 | Coulter | July 21, 1959 |
| 2,926,754 | Ragatz | Mar. 1, 1960 |